United States Patent
Han

(10) Patent No.: US 11,201,760 B2
(45) Date of Patent: Dec. 14, 2021

(54) DATA FORWARDING METHOD AND APPARATUS BASED ON OPERATING SYSTEM KERNEL BRIDGE

(71) Applicant: TENCENT TECHNOLOGY (SHENZHEN) COMPANY LIMITED, Shenzhen (CN)

(72) Inventor: Jian Han, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 225 days.

(21) Appl. No.: 16/351,322

(22) Filed: Mar. 12, 2019

(65) Prior Publication Data

US 2019/0207783 A1    Jul. 4, 2019

Related U.S. Application Data

(63) Continuation of application No. PCT/CN2017/117415, filed on Dec. 20, 2017.

(30) Foreign Application Priority Data

Dec. 26, 2016  (CN) .......................... 201611218589.8

(51) Int. Cl.
*H04L 12/46* (2006.01)
*H04L 29/12* (2006.01)
(Continued)

(52) U.S. Cl.
CPC ........ *H04L 12/462* (2013.01); *H04L 12/4625* (2013.01); *H04L 45/745* (2013.01); *H04L 49/30* (2013.01); *H04L 61/6009* (2013.01)

(58) Field of Classification Search
CPC ......... H04L 12/46; H04L 45/74; H04L 49/30; H04L 61/6009
See application file for complete search history.

(56) References Cited

U.S. PATENT DOCUMENTS 5,940,596 A * 8/1999 Rajan .................. H04L 49/1576
340/9.14
6,747,979 B1 * 6/2004 Banks ............... H04L 12/40091
370/401
(Continued)

FOREIGN PATENT DOCUMENTS

CN         101582880 A       11/2009
CN         102694727 A        9/2012
(Continued)

OTHER PUBLICATIONS

The World Intellectual Property Organization (WIPO) International Search Report for PCT/CN2017/117415 dated Feb. 27, 2018 5 Pages (including translation).
(Continued)

*Primary Examiner* — Jenee Holland
(74) *Attorney, Agent, or Firm* — Anova Law Group, PLLC

(57) ABSTRACT

A data forwarding method is provided for a data forwarding apparatus. The method includes, when a first port receives a to-be-forwarded data packet, executing a network adapter driver corresponding to the first port to read the to-be-forwarded data packet from a network adapter cache corresponding to the first port. The network adapter cache stores address forwarding information obtained from an operating system kernel bridge. The method also includes searching the address forwarding information in the network adapter cache for address forwarding information corresponding to the data packet and, when the address forwarding information corresponding to the data packet is found, determining a target network adapter driver for forwarding the data packet based on the found address forwarding information, and directly sending the data packet to the target network
(Continued)

adapter driver, such that the target network adapter driver forwards the data packet through a second port.

16 Claims, 5 Drawing Sheets

(51) Int. Cl.
*H04L 12/935* (2013.01)
*H04L 12/747* (2013.01)
*H04L 12/741* (2013.01)

(56) References Cited

U.S. PATENT DOCUMENTS

| | | | | |
|---|---|---|---|---|
| 2001/0027489 A1* | 10/2001 | Miyamoto | H04L 69/166 | 709/238 |
| 2002/0023150 A1* | 2/2002 | Osafune | H04L 29/12009 | 709/221 |
| 2002/0039365 A1* | 4/2002 | Kalpathy | H04L 12/4641 | 370/389 |
| 2002/0062333 A1* | 5/2002 | Anand | G06F 9/5044 | 718/105 |
| 2002/0087710 A1* | 7/2002 | Aiken | H04L 49/901 | 709/232 |
| 2003/0195919 A1* | 10/2003 | Watanuki | H04L 67/327 | 718/105 |
| 2003/0226008 A1* | 12/2003 | Keohane | G06F 21/606 | 713/150 |
| 2004/0015966 A1* | 1/2004 | MacChiano | H04L 69/32 | 718/1 |
| 2004/0078700 A1* | 4/2004 | Jeong | G11C 29/765 | 714/42 |
| 2004/0103225 A1* | 5/2004 | McAlpine | H04L 69/161 | 710/52 |
| 2004/0165604 A1* | 8/2004 | Oh | H04L 49/552 | 370/401 |
| 2005/0010822 A1* | 1/2005 | Zhou | H04L 63/0263 | 726/4 |
| 2005/0232262 A1* | 10/2005 | Toumura | H04L 45/00 | 370/389 |
| 2006/0039335 A1* | 2/2006 | Ono | H04W 92/02 | 370/338 |
| 2006/0227777 A1* | 10/2006 | Shimizu | H04L 45/60 | 370/389 |
| 2007/0033260 A1* | 2/2007 | Grouzdev | H04L 67/322 | 709/213 |
| 2008/0141358 A1* | 6/2008 | Lin | H04L 63/0245 | 726/12 |
| 2009/0024758 A1* | 1/2009 | Levy-Abegnoli | H04W 12/1206 | 709/237 |
| 2010/0183010 A1* | 7/2010 | Li | H04L 12/462 | 370/392 |
| 2011/0157189 A1* | 6/2011 | Diard | G06T 1/00 | 345/502 |
| 2012/0066509 A1* | 3/2012 | Lapp | G06F 21/6218 | 713/189 |
| 2012/0158929 A1* | 6/2012 | Shlomo | H04L 69/162 | 709/222 |
| 2014/0214761 A1* | 7/2014 | Leake | G06F 16/178 | 707/624 |
| 2014/0281265 A1* | 9/2014 | Atkisson | G06F 12/0806 | 711/136 |
| 2014/0304435 A1* | 10/2014 | Ayyagari | G06F 11/3055 | 710/17 |
| 2014/0369246 A1* | 12/2014 | Vaidya | H04B 1/40 | 370/311 |
| 2016/0050145 A1* | 2/2016 | Tsirkin | H04L 47/125 | 718/105 |
| 2016/0154673 A1* | 6/2016 | Morris | G06F 9/5044 | 718/100 |
| 2017/0078197 A1* | 3/2017 | CJ | H04L 45/745 | |
| 2017/0324670 A1* | 11/2017 | Hayashi | H04L 12/44 | |
| 2018/0123880 A1* | 5/2018 | Wen | G06F 13/4022 | |

FOREIGN PATENT DOCUMENTS

| | | | |
|---|---|---|---|
| CN | 103347014 A | * | 10/2013 |
| CN | 103404084 A | | 11/2013 |
| CN | 103812751 A | | 5/2014 |
| CN | 104883302 A | | 9/2015 |
| CN | 105553889 A | | 5/2016 |
| CN | 106789756 A | | 5/2017 |
| WO | 2015058698 A1 | | 4/2015 |

OTHER PUBLICATIONS

The State Intellectual Property Office of the People's Republic of China (SIPO) Office Action 1 for 201611218589.8 dated Jul. 29, 2019 10 Pages (including translation).

* cited by examiner

DATA FORWARDING METHOD AND APPARATUS BASED ON OPERATING SYSTEM KERNEL BRIDGE

RELATED APPLICATIONS

This application is a continuation application of PCT Patent Application No. PCT/CN2017/117415, filed on Dec. 20, 2017, which claims priority to Chinese Patent Application No. 201611218589.8, filed with the Chinese Patent Office on Dec. 26, 2016 and entitled "DATA SENDING METHOD AND APPARATUS BASED ON OPERATING SYSTEM KERNEL BRIDGE", content of all of which is incorporated herein by reference in its entirety.

FIELD OF TECHNOLOGY

This application relates to the field of computer technologies and, specifically, to a data forwarding method and apparatus based on an operating system kernel bridge.

BACKGROUND

Bridge is a Layer 2 network device used for connecting different network segments. The bridge includes several ports, several hosts connected to the ports may communicate with each other through packet forwarding of the bridge. After receiving a packet, the bridge either forwards or discards the received packet. The bridge needs only a switch chip and does not need a processor. A machine running a Linux kernel includes a processor and may implement a bridging function by using a virtual bridge device. However, the virtual bridge device often involves the operating system kernel and the forwarding performance often is undesired.

SUMMARY

Embodiments of this application provide a data forwarding method and apparatus based on an operating system kernel bridge, so as to improve data forwarding performance of the operating system kernel bridge.

One aspect of the present disclosure includes a data forwarding method based on an operating system kernel bridge for a data forwarding apparatus. The method includes, when a first port of the data forwarding apparatus receives a to-be-forwarded data packet, executing a network adapter driver corresponding to the first port to read the to-be-forwarded data packet from a network adapter cache corresponding to the first port. The network adapter cache stores address forwarding information obtained from the operating system kernel bridge. The method also includes searching the address forwarding information in the network adapter cache for address forwarding information corresponding to the data packet and, when the address forwarding information corresponding to the data packet is found, determining a target network adapter driver for forwarding the data packet based on the found address forwarding information, and directly sending the data packet to the target network adapter driver, such that the target network adapter driver forwards the data packet through a second port.

Another aspect of the present disclosure includes a data forwarding apparatus based on an operating system kernel bridge. The data forwarding apparatus includes a plurality of ports; a memory storing computer program instructions; and a processor coupled to the memory. When executing the computer program instructions, the processor is configured to perform: when a first port receives a to-be-forwarded data packet, executing a network adapter driver corresponding to the first port to read the to-be-forwarded data packet from a network adapter cache corresponding to the first port, the network adapter cache storing address forwarding information obtained from the operating system kernel bridge; searching the address forwarding information in the network adapter cache for address forwarding information corresponding to the data packet; and when the address forwarding information corresponding to the data packet is found, determining a target network adapter driver for forwarding the data packet based on the found address forwarding information, and directly sending the data packet to the target network adapter driver, such that the target network adapter driver forwards the data packet through a second port.

Another aspect of the present disclosure includes a non-volatile computer readable storage medium. The non-volatile computer readable storage medium stores computer program instructions executable by at least one processor to perform: when a first port receives a to-be-forwarded data packet, executing a network adapter driver corresponding to the first port to read the to-be-forwarded data packet from a network adapter cache corresponding to the first port, the network adapter cache storing address forwarding information obtained from the operating system kernel bridge; searching the address forwarding information in the network adapter cache for address forwarding information corresponding to the data packet; and when the address forwarding information corresponding to the data packet is found, determining a target network adapter driver for forwarding the data packet based on the found address forwarding information, and directly sending the data packet to the target network adapter driver, such that the target network adapter driver forwards the data packet through a second port.

Other aspects of the present disclosure can be understood by those skilled in the art in light of the description, the claims, and the drawings of the present disclosure.

BRIEF DESCRIPTION OF THE DRAWINGS

To describe the technical solutions of the embodiments of the present disclosure more clearly, the following briefly introduces the accompanying drawings. Apparently, the accompanying drawings in the following description show only some embodiments of the present disclosure, and a person skilled in the art may still derive other drawings from these accompanying drawings without creative efforts.

DETAILED DESCRIPTION

The following describes the technical solutions in embodiments of the present disclosure with reference to the accompanying drawings in the embodiments of the present disclosure. Apparently, the described embodiments are some rather than all of embodiments of the present disclosure. Other embodiments obtained by a person skilled in the art based on the embodiments of the present disclosure without creative efforts shall fall within the protection scope of the present disclosure.

The embodiments of the present disclosure provide a data forwarding method and apparatus based on an operating system kernel bridge.

An embodiment of the present disclosure provides a data forwarding system, including a data forwarding apparatus based on an operating system kernel bridge according to the embodiments of the present disclosure. The data forwarding apparatus may be integrated in a server, such a server running a Linux operating system.

Figure 1A:
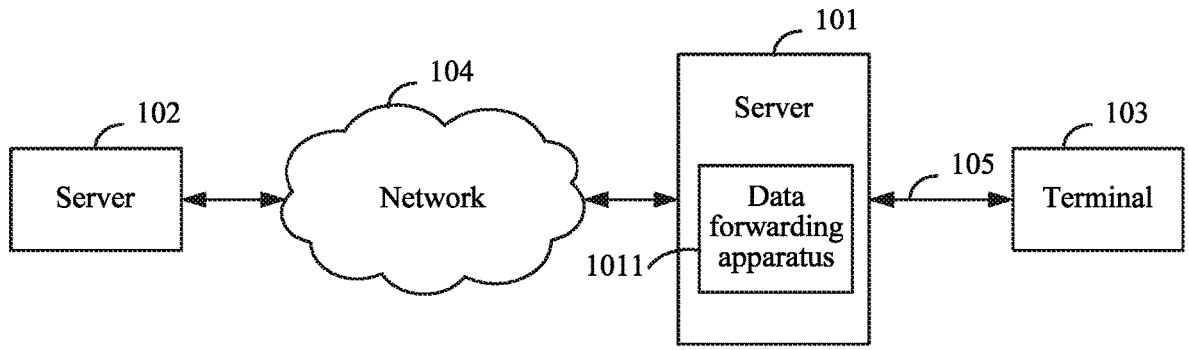
FIG. 1A is a schematic diagram of a scenario of a data forwarding system according to an embodiment of the present disclosure.

As shown in FIG. 1A, the data forwarding system includes a server 101, a server 102, and a terminal 103, and a data forwarding apparatus 1011 based on an operating system kernel bridge according to the embodiments of the present disclosure is integrated in the server 101. The server 101 and the server 102 are connected to each other by using a network 104, and the server 101 and the terminal 103 are connected to each other by using a link 105.

When the server 101 receives a to-be-forwarded data packet from a first port, the data forwarding apparatus 1011 in the server 101 is configured to execute a first network adapter driver corresponding to the first port, to read the to-be-forwarded data packet from a corresponding network adapter cache, and the network adapter cache stores address forwarding information obtained from an operating system kernel bridge. Then, the data forwarding apparatus 1011 searches the address forwarding information in the cache for address forwarding information corresponding to the data packet. When the address forwarding information corresponding to the data packet is found, a second port used for forwarding the data packet is determined based on the found address forwarding information. The data forwarding apparatus 1011 determines a second network adapter driver corresponding to the second port, and sends the data packet to the second network adapter driver. The second network adapter driver sends the data packet to the server 102 or the terminal 103 through the second port.

In addition, the server 101 is further configured to convert a signal sent by the server 102 or the terminal 103 into network data by using a network adapter and store the network data in a corresponding network adapter cache.

Accordingly, the data forwarding method includes: reading the to-be-forwarded data packet from the network adapter cache; searching the address forwarding information in the cache for the address forwarding information corresponding to the data packet; determining, when the address forwarding information corresponding to the data packet is found, a target network adapter driver used for forwarding the data packet, based on the found address forwarding information; and directly sending the data packet to the target network adapter driver, so that the target network adapter driver forwards the data packet. In this solution, the data packet may be directly sent to the target network adapter driver, and the data packet is forwarded by using the target network adapter driver. The data packet does not need to be first sent to an operating system kernel bridge subsystem and then the operating system kernel bridge subsystem does not need to perform forwarding processing to send out data. Therefore, this solution can improve a data forwarding speed of the operating system kernel bridge, thereby improving data forwarding performance of the operating system kernel bridge.

In some embodiments of the present disclosure, descriptions are provided from the perspective of a data forwarding apparatus based on an operating system kernel bridge. The data forwarding apparatus may be specifically integrated in a server. For example, the server may be a Linux server.

A data forwarding method based on an operating system kernel bridge includes: reading, by a first network adapter driver, a to-be-forwarded data packet from a first network adapter cache; searching address forwarding information in the cache for address forwarding information corresponding to the data packet; determining, when the address forwarding information corresponding to the data packet is found, an egress port of the data packet based on the found address forwarding information; and sending the data packet to a second network adapter driver corresponding to the egress port, that is, a target network adapter driver, so that the target network adapter driver forwards the data packet through the egress port.

Figure 1B:
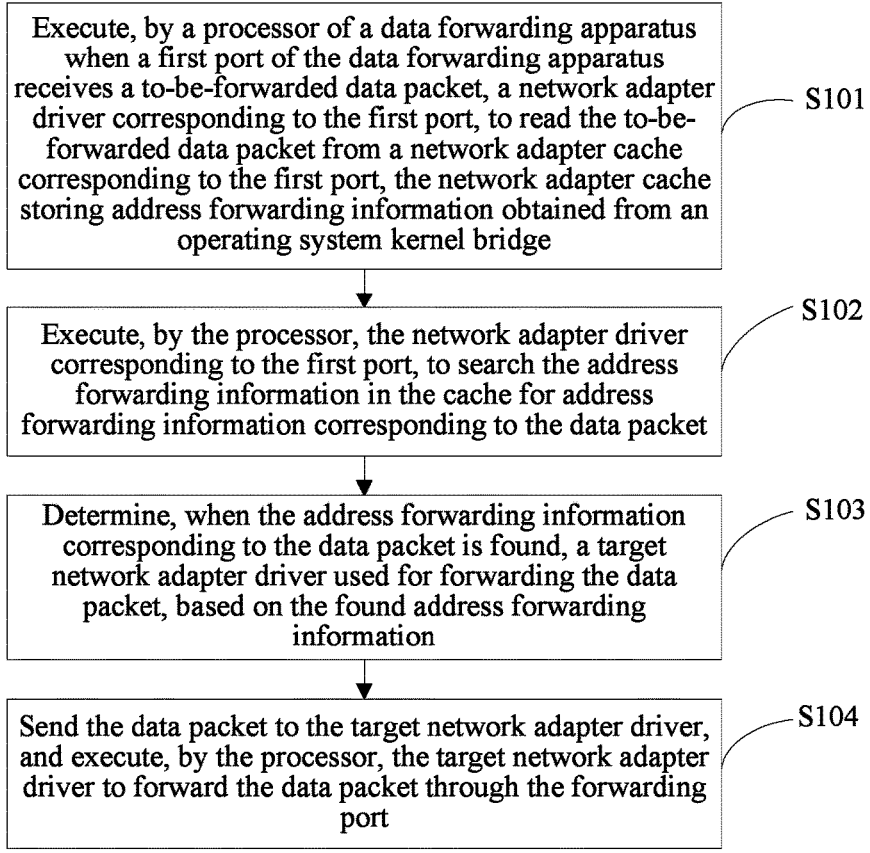
FIG. 1B is a flowchart of a data forwarding method based on an operating system kernel bridge according to an embodiment of the present disclosure.

As shown in FIG. 1B, a flowchart of the data forwarding method based on an operating system kernel bridge, which may be specifically performed by the data forwarding apparatus shown in FIG. 1A, includes the following operations.

S101: Executing, by a processor of a data forwarding apparatus when a first port of the data forwarding apparatus receives a to-be-forwarded data packet, a network adapter driver corresponding to the first port, to read the to-be-forwarded data packet from a network adapter cache corresponding to the first port. The network adapter cache also stores address forwarding information obtained from an operating system kernel bridge.

The network adapter cache is used for storing a network data packet forwarded by a network adapter, and each network adapter may correspond to a network adapter cache. In some embodiments of the present disclosure, the network adapter may be a physical network adapter, or a virtual network adapter.

In one embodiment, an operating system may be a Linux system, or other operating system.

In some embodiments, before step S101, the operations may further include: copying the address forwarding information of the operating system kernel bridge, and caching the copied address forwarding information in the network adapter cache to be accessed directly by the network adapter driver. This facilitates determining address forwarding information of the data packet when the data packet is subsequently forwarded and before the data packet enters the operating system kernel bridge. In some embodiments of the present disclosure, when the address forwarding information of the operating system kernel bridge changes, the operating system kernel bridge sends updated address forwarding information to the network adapter cache. That is, the address forwarding information is synchronized between the operating system kernel bridge and the network adapter driver.

S102: Executing, by the processor, the network adapter driver corresponding to the first port, to search the address forwarding information in the network adapter cache for address forwarding information corresponding to the data packet.

The address forwarding information may include information used for forwarding or sending the data packet, such as forwarding database entry (fdb) information, and a main function of the address forwarding information is for a network device such as a server to forward the data packet at a data link layer, and is used for determining which port the data packet is sent to. The address forwarding information mainly includes a corresponding relationship (that is, a mapping relationship) between a media access control (MAC) address and a forwarding port.

The address forwarding information may include an address forwarding table such as a MAC address forwarding table, and the MAC address may also be referred to as a physical address, a hardware address, or the like.

The address forwarding table includes a corresponding relationship (a mapping relationship) between a forwarding address and the forwarding port. Specifically, the address forwarding table includes several address forwarding entries, and each address forwarding entry includes the corresponding relationship (the mapping relationship) between the forwarding address and the forwarding port.

For example, the MAC address forwarding table includes several MAC address forwarding entries, and each entry includes a corresponding relationship between the MAC address and the forwarding port. The address forwarding table may be a Layer 2 forwarding table.

When the address forwarding information in the cache includes the address forwarding table, the process of "searching the address forwarding information in the cache for address forwarding information corresponding to the data packet" may include: obtaining a destination address corresponding to the data packet; and searching, based on the destination address, the address forwarding table in the cache for an address forwarding entry corresponding to the destination address.

The address forwarding entry corresponding to the destination address may include a corresponding relationship between the destination address and the forwarding port. For example, a destination MAC address corresponding to the data packet may be obtained, then the MAC address forwarding table is searched, based on the destination MAC address, for an address forwarding entry corresponding to the destination MAC address, and the address forwarding entry corresponding to the destination MAC address includes a corresponding relationship between the destination MAC address and the forwarding port.

S103: Determining, when the address forwarding information corresponding to the data packet is found, a target network adapter driver used for forwarding the data packet, based on the found address forwarding information.

The process of "determining a target network adapter driver used for forwarding the data packet, based on the found address forwarding information" includes: searching for a corresponding forwarding port based on the found address forwarding information; and determining a network adapter driver associated with the forwarding port as the target network adapter driver used for forwarding the data packet.

Specifically, when the address forwarding information includes the address forwarding table, the address forwarding table includes the several address forwarding entries, and each address forwarding entry includes the corresponding relationship between the forwarding address and the forwarding port. In this case, the found address forwarding information includes the address forwarding entry corresponding to the destination address, and the destination address is the destination address of the data packet. That is, the address forwarding entry corresponding to the destination address includes the mapping relationship between the destination address and the forwarding port.

The process of "searching for a corresponding forwarding port based on the found address forwarding information" may include: searching for a corresponding forwarding port based on the found address forwarding entry.

For example, when the address forwarding information in the cache includes the MAC address forwarding table, the destination MAC address corresponding to the data packet may be obtained, and then the MAC address forwarding table is searched, based on the destination MAC address, for a MAC address forwarding entry corresponding to the destination MAC address. After the MAC address forwarding entry corresponding to the destination MAC address is found, a corresponding forwarding port may be searched for based on the MAC address forwarding entry.

In one embodiment, the network adapter driver associated with the forwarding port may be determined based on a set of mapping relationships between a port and a driver. That is, the process of "determining a network adapter driver associated with the forwarding port as the target network adapter driver used for forwarding the data packet" may include: determining, based on the forwarding port and a mapping relationship between the port and the driver, the network adapter driver associated with the forwarding port. The mapping relationship between the port and the driver includes a mapping relationship (a corresponding relationship) between the forwarding port and the network adapter driver; and determining the network adapter driver associated with the forwarding port as the target network adapter driver used for forwarding the data packet.

In one embodiment, the network adapter driver is a driver whose full name is "device driver", is a special program that enables a computer central processing unit (CPU) to control and use a device, and is equivalent to a hardware interface. An operating system controls operation of a hardware device by using the device driver interface.

S104: Sending the data packet to the target network adapter driver, and executing, by the processor, the target network adapter driver to forward the data packet through the forwarding port.

Specifically, the process of "sending the data packet to the target network adapter driver corresponding to the forwarding port" may include: sending the data packet to the target network adapter driver through a communications channel between the network adapter driver corresponding to the first port and the target network adapter driver.

In some embodiments, when the address forwarding information corresponding to the data packet is not found, the data packet may be sent to the kernel bridge system, so that the kernel bridge system sends out the data packet.

For example, when the address forwarding entry corresponding to the destination address is not found, the data packet may be sent to the kernel bridge system (for example, a Linux kernel bridge subsystem). When the kernel bridge system starts a learning mode, and sends the data packet to a corresponding network adapter driver based on a learning result, so that the network adapter driver sends out the data packet.

It may be learned from above that one embodiment of the present disclosure uses the method, including: reading the to-be-forwarded data packet from the network adapter cache; searching the address forwarding information in the cache for the address forwarding information corresponding to the data packet; determining, when the address forwarding information corresponding to the data packet is found, the target network adapter driver used for forwarding the data packet, based on the found address forwarding information; and directly sending the data packet to the target network adapter driver, so that the target network adapter driver forwards the data packet. In this solution, the data packet may be directly sent to the target network adapter driver without going through the kernel bridge system, and the data packet is forwarded by using the target network adapter driver. That is, the data packet does not need to be first sent to an operating system kernel bridge subsystem and then the subsystem does not need to perform forwarding processing to send out data. Therefore, this solution can improve a data forwarding speed of the operating system kernel bridge, thereby improving data forwarding performance of the operating system kernel bridge and saving a device resource.

According to the method described in the embodiment shown in FIG. 1B, the following further provides an example, in which an operating system integrated with the data forwarding apparatus is running on a server of a Linux (referred to as a Linux server).

Figure 2A:
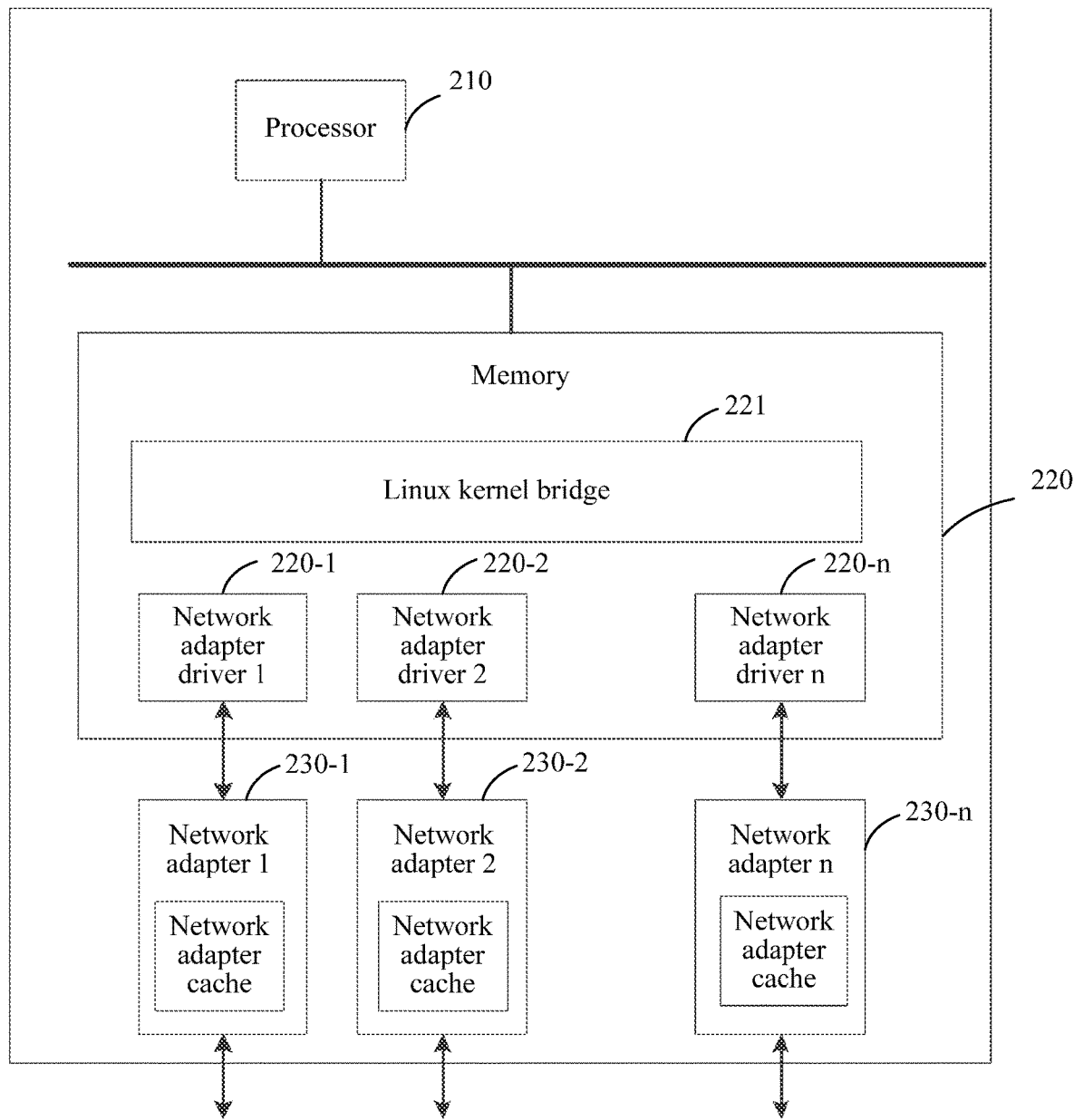
FIG. 2A is a schematic structural diagram of a Linux bridge system according to an embodiment of the present disclosure.

As shown in FIG. 2A, the Linux server may include a Linux bridge system, and the system may include: a processor 210, a memory 220, and network adapters 230-1 to 230-n. The memory 220 include a Linux kernel bridge subsystem 221, and network adapter drivers 220-1 to 220-n of the network adapters 230-1 to 230-n, where n is a natural number.

The following describes a data forwarding method in the present disclosure in detail based on the Linux bridge system shown in FIG. 2A.

Figure 2B:
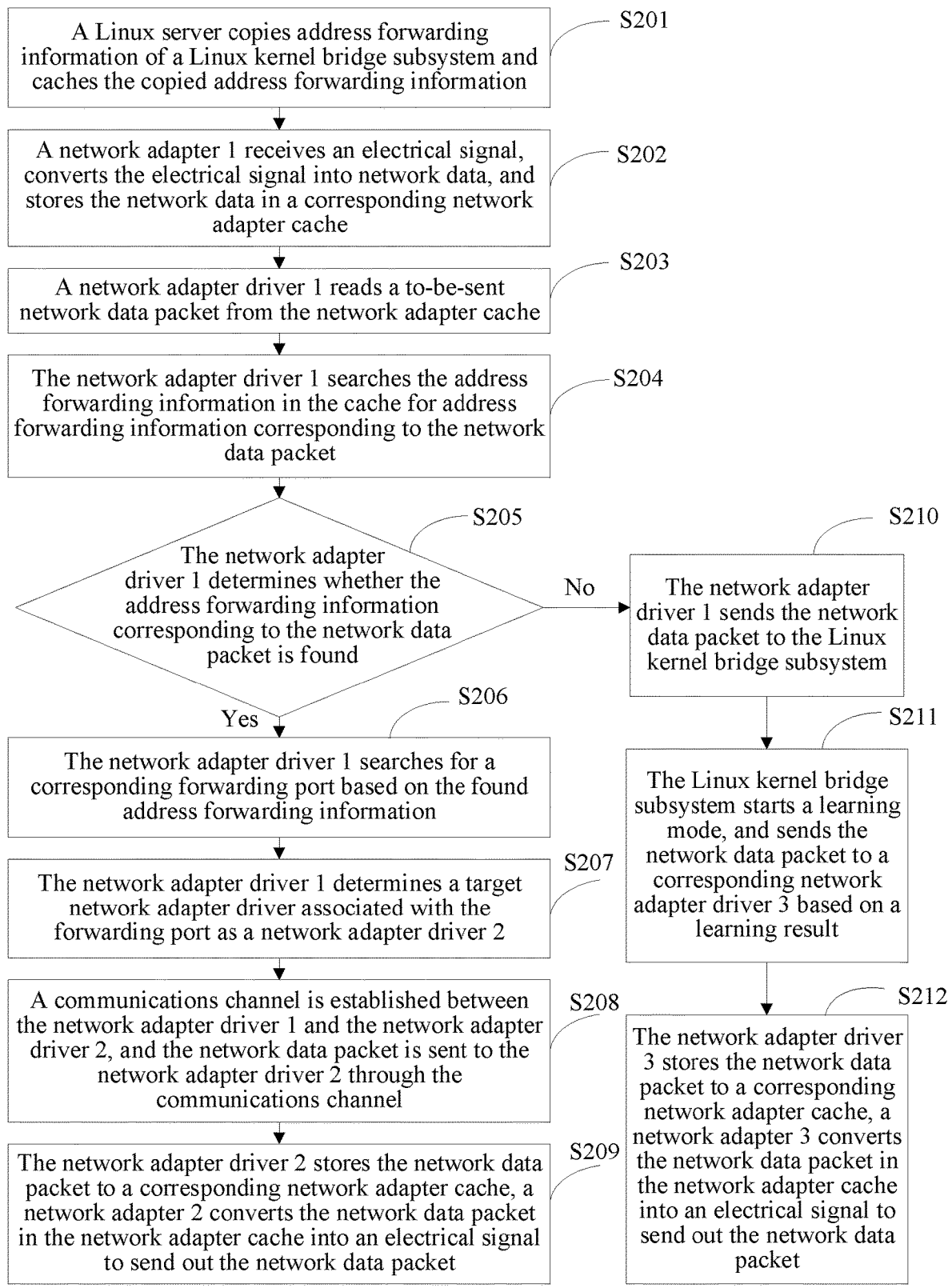
FIG. 2B is a flowchart of another data forwarding method based on an operating system kernel bridge according to an embodiment of the present disclosure.

As shown in FIG. 2B, a data forwarding method based on an operating system kernel bridge includes the following specific processes.

S201: A Linux server copies address forwarding information of a Linux kernel bridge subsystem and caches the copied address forwarding information in the network adapter cache. For example, a function is inserted into the Linux kernel bridge subsystem to copy and cache the fdb information of the Linux kernel bridge subsystem.

The address forwarding information may include a MAC address forwarding table, the MAC address forwarding table includes several MAC address entries, and each entry includes a corresponding relationship between a MAC address and a forwarding port.

For another example, a network adapter driver 1 may copy the address forwarding information of the Linux kernel bridge subsystem and cache the copied address forwarding information in its network adapter cache.

S202: The network adapter 1 receives an electrical signal, converts the electrical signal into network data, and stores the network data in the corresponding network adapter cache.

For example, the network adapter 1 receives the electrical signal by using a network interface, and then converts the electrical signal into corresponding data to obtain a network data packet.

S203: The network adapter driver 1 reads the to-be-forwarded network data packet from the network adapter cache.

S204: The network adapter driver 1 searches the address forwarding information in the cache for address forwarding information corresponding to the network data packet.

For example, a function may be inserted into the network adapter 1 to perform steps S204 to S208. Specifically, the network adapter driver 1 obtains a destination MAC address corresponding to the network data packet, and then searches, based on the destination MAC address, a MAC address forwarding table in the cache for a MAC address entry corresponding to the destination MAC address.

S205: The network adapter driver 1 determines whether the address forwarding information corresponding to the network data packet is found, if yes, performs step S206, and if no, performs step S210.

For example, the address forwarding information is searched, by using a function intnfp_process (uint32_tif_index, structsk_buff*skb), for the address forwarding information corresponding to the network data packet, if the address forwarding information corresponding to the network data packet is found, return 0, and if the address forwarding information corresponding to the network data packet is not found, return −1.

S206: The network adapter driver 1 searches for a corresponding forwarding port based on the found address forwarding information.

When the network adapter driver 1 found the MAC address entry corresponding to the destination MAC address, a corresponding forwarding port may be searched for based on the MAC address entry.

A function dev_queue_xmit( ) may be called to perform step S206 to S208.

For example, in the network adapter driver 1, in tun_get_user( ), after a data packet sk_buff is generated, nfp_process( ) is performed, and if nfp_process( ) returns 0, it indicates that the fdb information corresponding to the network data packet is found. In this case, dev_queue_xmit( ) may be called to forward the data packet (performing steps S206 to S208), and tun_netif_rx_ni(skb) is not further performed, that is, the data packet is not further transmitted to the Linux kernel bridge subsystem.

S207: The network adapter driver 1 determines a target network adapter driver associated with the forwarding port as a network adapter driver 2.

S208: A communications channel is established between the network adapter driver 1 and the network adapter driver 2, and the network data packet is sent to the network adapter driver 2 through the communications channel.

S209: The network adapter driver 2 stores the network data packet to a corresponding network adapter cache, the network adapter 2 converts the network data packet in the network adapter cache into an electrical signal to forward the network data packet.

S210: The network adapter driver 1 sends the network data packet to the Linux kernel bridge subsystem.

For example, in the network adapter driver 1, in tun_get_user( ), after the data packet sk_buff is generated, nfp_process( ) is performed, and if nfp_process( ) returns −1, tun_netif_rx_ni(skb) is further performed to transmit the data packet to the Linux kernel bridge subsystem.

S211: The Linux kernel bridge subsystem starts a learning mode, and sends the network data packet to a corresponding network adapter driver 3 based on a learning result.

S212: The network adapter driver 3 stores the network data packet to a corresponding network adapter cache, a network adapter 3 converts the network data packet in the network adapter cache into an electrical signal to forward the network data packet.

In one embodiment, the network adapter driver 1 may perform nfp_process( ) in tun_get_user( ) after the data packet sk_buff is generated, if nfp_process( ) returns 0, it indicates that the fdb information corresponding to the network data packet is found, and dev_queue_xmit( ) is called to forward the data packet, in this case, tun_netif_rx_ni(skb) is not further performed, that is, the data packet is not further transmitted to the Linux kernel bridge subsystem, and if nfp_process( ) returns −1, the tun_netif_rx_ni(skb) is further performed to transmit the data packet to the Linux kernel bridge subsystem. Specific codes are as follows:

```
if (!nfp_process(skb->dev->ifindex, skb)) {
    tun_netif_rx_ni(skb);
}.
```

It may be learned from above that one embodiment of the present disclosure may use the method, including: reading the to-be-forwarded data packet from the network adapter cache; searching the address forwarding information in the cache for the address forwarding information corresponding to the data packet; determining, when the address forwarding information corresponding to the data packet is found, a target network adapter driver used for sending the data packet, based on the found address forwarding information; and directly sending the data packet to the target network adapter driver, so that the target network adapter driver forwards the data packet. When the address forwarding information corresponding to the data packet is not found, the data packet is sent to a kernel bridge system, so that the data packet is sent out by using the kernel bridge system. In this solution, some data packets may be directly sent to the target network adapter driver, and the data packets are forwarded by using the target network adapter driver. The data packets do not need to be first sent to the Linux kernel bridge subsystem and then the subsystem does not need to perform forwarding processing to send out data. Therefore, this solution can improve a data forwarding speed of a Linux kernel bridge, thereby improving data forwarding performance of the Linux kernel bridge and saving a resource of the server.

Figure 3A:
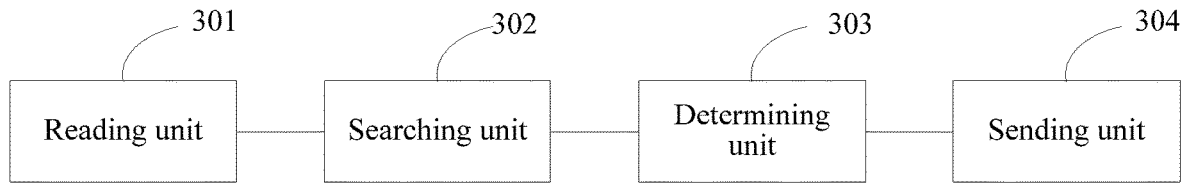
FIG. 3A is a schematic structural diagram of a data forwarding apparatus based on an operating system kernel bridge according to an embodiment of the present disclosure.

Further, one embodiment of the present disclosure also provides a data forwarding apparatus based on an operating system kernel bridge. As shown in FIG. 3A, the data forwarding apparatus includes: a reading unit 301, a searching unit 302, a determining unit 303, and a sending unit 304.

The reading unit 301 is configured to read, when a first port of the data forwarding apparatus receives a to-be-forwarded data packet, the to-be-forwarded data packet from a network adapter cache corresponding to the first port, and the network adapter cache stores address forwarding information obtained from an operating system kernel bridge. In one embodiment, an operating system may be a Linux system, or another operating system.

The network adapter cache is used for storing network data converted by a network adapter, and each network adapter may correspond to a network adapter cache.

The searching unit 302 is configured to search the address forwarding information in the cache for address forwarding information corresponding to the data packet.

The fdb information is information used for forwarding or sending the data packet, and a main function of the address forwarding information is for a network device such as a server to forward the data packet at a data link layer, and is used for determining which port is the data packet sent to. The address forwarding information mainly includes a corresponding relationship (that is, a mapping relationship) between a MAC address and a forwarding port.

Figure 3B:
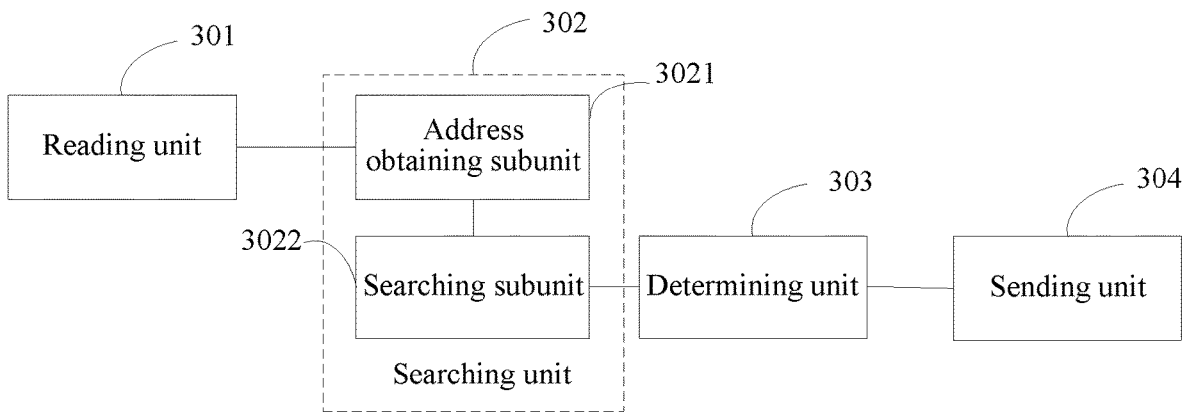
FIG. 3B is a schematic structural diagram of another data forwarding apparatus based on an operating system kernel bridge according to an embodiment of the present disclosure.

For example, referring to FIG. 3B, when the address forwarding information in the cache includes an address forwarding table, the searching unit 302 may specifically include an address obtaining subunit 3021 and a searching subunit 3022.

The address obtaining subunit 3021 is configured to obtain a destination address corresponding to the data packet. The searching subunit 3022 is configured to search, based on the destination address, the address forwarding table in the cache for address forwarding information corresponding to the destination address.

For example, the address obtaining subunit 3021 may be configured to obtain a destination MAC address corresponding to the data packet; and the searching subunit 3022 is configured to search, based on the destination MAC address, a MAC address forwarding table for an address forwarding entry corresponding to the destination MAC address.

The determining unit 303 is configured to determine, when the address forwarding information corresponding to the data packet is found, a target network adapter driver used for forwarding the data packet, based on the found address forwarding information.

Figure 3C:
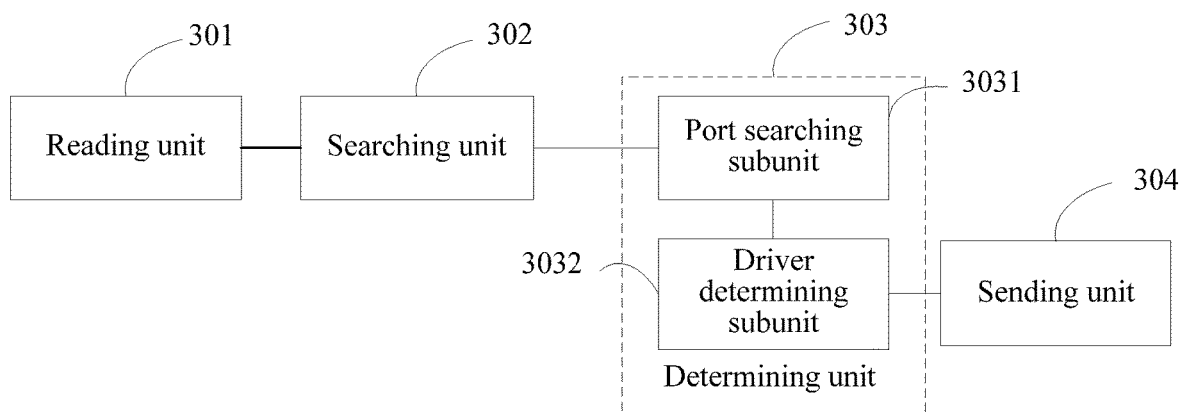
FIG. 3C is a schematic structural diagram of another data forwarding apparatus based on an operating system kernel bridge according to an embodiment of the present disclosure.

For example, referring to FIG. 3C, the determining unit 303 may include a port searching subunit 3031 and a driver determining subunit 3032.

The port searching subunit 3031 is configured to search for a corresponding forwarding port based on the found address forwarding information. The driver determining subunit 3032 is configured to determine a network adapter driver associated with the forwarding port as the target network adapter driver used for sending the data packet.

For example, the port searching subunit 3031 is configured to search for a corresponding forwarding port based on the found MAC address entry.

For another example, the driver determining subunit 3032 is configured to determine, based on the forwarding port and a mapping set between a port and a driver, the network adapter driver associated with the forwarding port, and the mapping set between the port and the driver including a mapping relationship (a corresponding relationship) between the forwarding port and the network adapter driver.

In one embodiment, the network adapter driver is a driver whose full name is "device driver", is a special program that enables a computer central processing unit (CPU) to control and use a device, and is equivalent to a hardware interface. An operating system controls operation of a hardware device by using the interface.

The sending unit 304 is configured to send the data packet to the target network adapter driver, so that the target network adapter driver forwards the data packet through a second port.

For example, the sending unit 304 may specifically include a channel establishing subunit 3041 and a sending subunit 3042.

The channel establishing subunit 3041 is configured to establish a communications channel between a network adapter driver corresponding to the first port and the target network adapter driver. The sending subunit 3042 is configured to forward the data packet to the target network adapter driver through the communications channel.

In some embodiments, the data forwarding apparatus may further include a caching unit 305, and the caching unit is configured to: copy address forwarding information of a kernel bridge system before the reading unit 301 reads the data packet; and cache the copied address forwarding information.

During specific implementation, the foregoing units may be implemented as independent entities, or may be combined arbitrarily, or may be implemented as a same entity or several entities. For specific implementation of the foregoing units, refer to the foregoing method embodiments. Details are not described herein again.

The data forwarding apparatus based on an operating system kernel bridge may be specifically integrated in a network device such as a server, and the server may be a Linux server, or the like. In actual application, the data forwarding apparatus may be integrated in a network adapter driver.

Figure 4:
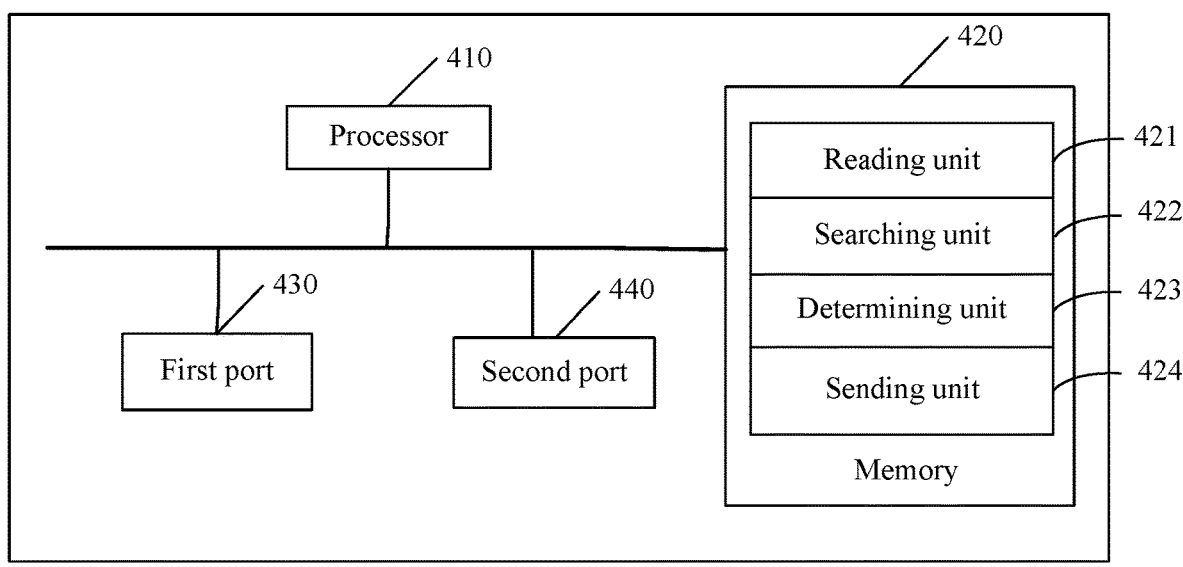
FIG. 4 is a schematic structural diagram of another data forwarding apparatus based on an operating system kernel bridge according to an embodiment of the present disclosure.

FIG. 4 is yet another schematic structural diagram of a data forwarding apparatus based on an operating system kernel bridge according to an embodiment of the present disclosure. As shown in FIG. 4, the data forwarding apparatus includes: a processor 410, a memory 420 connected to the processor 410, a first port 430 and a second port 440, the memory 420 stores machine or computer readable instructions that can be executed by the processor 410 to implement a reading unit 421, a searching unit 422, a determining unit 423, and a sending unit 424.

The reading unit 421 is configured to read, when the first port 430 of the data forwarding apparatus receives a to-be-forwarded data packet, the to-be-forwarded data packet from a network adapter cache corresponding to the first port 430, the network adapter cache storing address forwarding information obtained from an operating system kernel bridge.

The searching unit 422 is configured to search the address forwarding information in the cache for address forwarding information corresponding to the data packet.

The determining unit 423 is configured to determine, when the address forwarding information corresponding to the data packet is found, a target network adapter driver used for forwarding the data packet, based on the found address forwarding information; and The sending unit 424 is configured to send the data packet to the target network adapter driver to forward the data packet through the second port 440.

In one embodiment of the present disclosure, specific functions and implementations of the foregoing reading unit 421, the searching unit 422, the determining unit 423 and the sending unit 424 are the same as those of the foregoing units 301 to 304, and details are not described herein again.

It may be learned from above that the data forwarding apparatus in one embodiment of the present disclosure reads the to-be-forwarded data packet from the network adapter cache by using the reading unit 301, then searches, by using the searching unit 302, the address forwarding information in the cache for the address forwarding information corresponding to the data packet, determines, by the determining unit 303, when the address forwarding information corresponding to the data packet is found, the target network adapter driver used for sending the data packet, based on the found address forwarding information, and directly sends the data packet to the target network adapter driver by using the sending unit 304, so that the target network adapter driver forwards the data packet. In this solution, the data packet may be directly sent to the target network adapter driver, and the data packet is forwarded by using the target network adapter driver. The data packet does not need to be first sent to an operating system kernel bridge subsystem and then the subsystem does not need to perform forwarding processing to send out data. Therefore, this solution can improve a data forwarding speed of the operating system kernel bridge, thereby improving data forwarding performance of the operating system kernel bridge and saving a device resource.

A person of ordinary skill in the art may understand that all or some of the steps of the methods in the foregoing embodiments may be implemented by a program instructing relevant hardware. The program may be stored in a computer readable storage medium. The storage medium may include: a read-only memory (ROM), a random-access memory (RAM), a magnetic disk, an optical disc, or the like.

A data forwarding method and apparatus based on an operating system kernel bridge provided in the embodiments of the present disclosure are described above in detail. Although the principles and implementations of the present disclosure are described by using specific examples in this specification, the descriptions of the foregoing embodiments are merely intended to help understand the method of the present disclosure and the core idea of the method. Meanwhile, a person skilled in the art may make modifications to the specific implementations and application range according to the idea of the present disclosure. In conclusion, the content of this specification should not be construed as a limitation to the present disclosure.

What is claimed is:

1. A data forwarding method for execution by a data forwarding apparatus, wherein the data forwarding apparatus includes an operating system kernel bridge, a first and a second network adaptor driver, a first and a second port, and a first and a second network adaptor, and wherein the first network adaptor driver is in communication with the first network adapter and the first port, and the second network adaptor driver is in communication with the second network adapter and the second port, the data forwarding method comprising:

in response to receiving by the first port a data packet, reading by the first network adapter driver the data packet from a first network adapter cache corresponding to the first port, the first network adapter cache storing address forwarding information obtained from the operating system kernel bridge, wherein before reading the data packet from the first network adapter cache, the data forwarding method further comprises:
copying the address forwarding information of the operating system kernel bridge; and
storing the address forwarding information as copied into the first network adapter cache;

searching the address forwarding information in the first network adapter cache for address forwarding information corresponding to the data packet; and in response to determining the address forwarding information corresponding to the data packet is found, determining the second network adapter driver is a target network adapter driver for forwarding the data packet based on the address forwarding information, and sending the data packet to the second network adapter driver, such that the second network adapter driver forwards the data packet through the second port.

2. The data forwarding method according to claim 1, further comprising:
- selecting the second port based on the address forwarding information; and
- determining as the target network adapter driver the second network adapter driver corresponding to the second port.

3. The data forwarding method according to claim 1, further comprising:
- obtaining a destination address corresponding to the data packet; and
- searching, based on the destination address, an address forwarding table for an address forwarding entry corresponding to the destination address.

4. The data forwarding method according to claim 1, further comprising:
- sending the data packet to the target network adapter driver through a communications channel between the first network adapter driver corresponding to the first port and the target network adapter driver.

5. The data forwarding method according to claim 1, further comprising:
- in response to determining the address forwarding information corresponding to the data packet is not found, sending the data packet to the operating system kernel bridge, such that the operating system kernel bridge forwards the data packet.

6. The data forwarding method according to claim 1, wherein the address forwarding information includes a relationship between forwarding addresses and forwarding ports.

7. A data forwarding apparatus, comprising: an operating system kernel bridge; a first and a second network adaptor driver; a first and a second port; a first and a second network adaptor, wherein the first network adaptor driver is in communication with the first network adapter and the first port, and the second network adaptor driver is in communication with the second network adapter and the second port; a memory storing computer program instructions; and a processor coupled to the memory and, when executing the computer program instructions, configured to perform:
- in response to receiving by the first port a data packet, reading by the first network adapter driver the data packet from a first network adapter cache corresponding to the first port, the first network adapter cache storing address forwarding information obtained from the operating system kernel bridge, wherein before reading the data packet from the first network adapter cache, the processor is further configured to perform:
  - copying the address forwarding information of the operating system kernel bridge; and
  - storing the address forwarding information as copied into the first network adapter cache;
- searching the address forwarding information in the first network adapter cache for address forwarding information corresponding to the data packet; and
- in response to determining the address forwarding information corresponding to the data packet is found, determining the second network adapter driver is a target network adapter driver for forwarding the data packet based on the address forwarding information, and sending the data packet to the second network adapter driver, such that the second network adapter driver forwards the data packet through the second port.

8. The data forwarding apparatus according to claim 7, wherein the processor is further configured to perform:
- selecting the second port based on the address forwarding information; and
- determining as the target network adapter driver the second network adapter driver corresponding to the second port.

9. The data forwarding apparatus according to claim 7, wherein the processor is further configured to perform:
- obtaining a destination address corresponding to the data packet; and
- searching, based on the destination address, an address forwarding table for an address forwarding entry corresponding to the destination address.

10. The data forwarding apparatus according to claim 7, wherein the processor is further configured to perform:
- sending the data packet to the target network adapter driver through a communications channel between the first network adapter driver corresponding to the first port and the target network adapter driver.

11. The data forwarding apparatus according to claim 7, wherein the processor is further configured to perform:
- in response to determining the address forwarding information corresponding to the data packet is not found, sending the data packet to the operating system kernel bridge, such that the operating system kernel bridge forwards the data packet.

12. A non-volatile computer readable storage medium storing computer program instructions executable by at least one processor of a data forwarding apparatus, wherein the data forwarding apparatus further includes an operating system kernel bridge, a first and a second network adaptor driver, a first and a second port, and a first and a second network adaptor, and wherein the first network adaptor driver is in communication with the first network adapter and the first port, and the second network adaptor driver is in communication with the second network adapter and the second port, and wherein the computer program instructions are executed by the at least one processor to perform:
- in response to receiving by the first port a data packet, reading by the first network adapter driver the data packet from a first network adapter cache corresponding to the first port, the first network adapter cache storing address forwarding information obtained from the operating system kernel bridge, wherein before reading the data packet from the first network adapter cache, the computer program instructions are executed by the at least one processor to further perform:
  - copying the address forwarding information of the operating system kernel bridge; and
  - storing the address forwarding information as copied into the first network adapter cache;
- searching the address forwarding information in the first network adapter cache for address forwarding information corresponding to the data packet; and
- in response to determining the address forwarding information corresponding to the data packet is found, determining the second network adapter driver is a target network adapter driver for forwarding the data packet based on the address forwarding information, and sending the data packet to the second network adapter driver, such that the second network adapter driver forwards the data packet through the second port.

13. The non-volatile computer readable storage medium according to claim 12, wherein the computer program instructions are executed by the at least one processor to further perform:
- selecting the second port based on the address forwarding information; and
- determining as the target network adapter driver the second network adapter driver corresponding to the second port.

14. The non-volatile computer readable storage medium according to claim 12, wherein the computer program instructions are executed by the at least one processor to further perform:
- obtaining a destination address corresponding to the data packet; and
- searching, based on the destination address, an address forwarding table for an address forwarding entry corresponding to the destination address.

15. The non-volatile computer readable storage medium according to claim 12, wherein the computer program instructions are executed by the at least one processor to further perform:
- sending the data packet to the target network adapter driver through a communications channel between the first network adapter driver corresponding to the first port and the target network adapter driver.

16. The non-volatile computer readable storage medium according to claim 12, wherein the computer program instructions are executed by the processor to further perform:
- in response to determining the address forwarding information corresponding to the data packet is not found, sending the data packet to the operating system kernel bridge, such that the operating system kernel bridge forwards the data packet.

* * * * *